Apr. 10, 1923.
W. E. McDONELL
OPHTHALMIC MOUNTING
Filed May 10, 1922
1,451,098
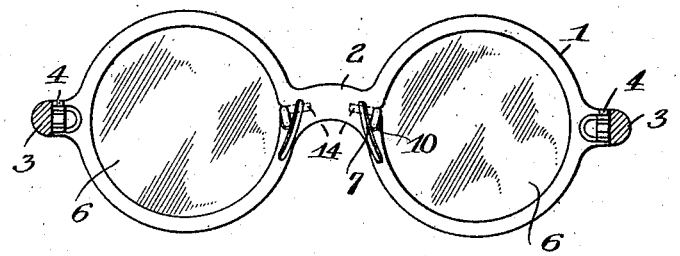
Fig.1
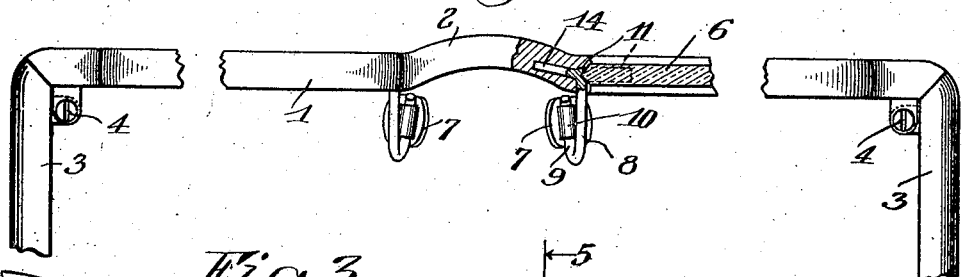
Fig.2
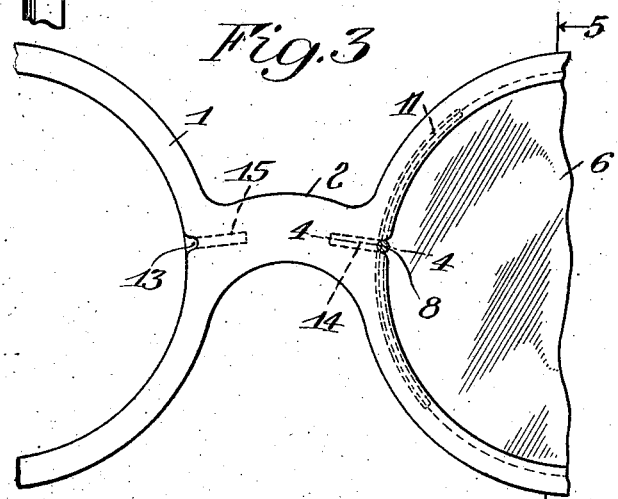
Fig.3
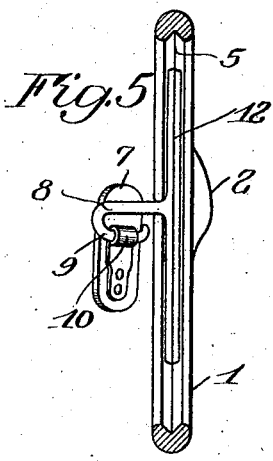
Fig.5
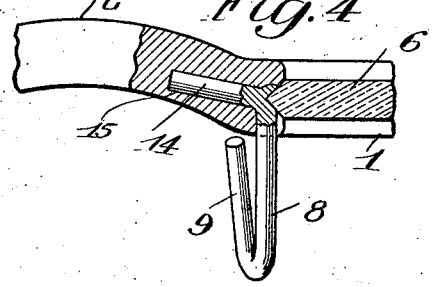
Fig.4
Fig.6
INVENTOR.
William E. McDonell
BY Davis
HIS ATTORNEYS.

Patented Apr. 10, 1923.

1,451,098

UNITED STATES PATENT OFFICE.

WILLIAM E. McDONELL, OF ROCHESTER, NEW YORK, ASSIGNOR TO SHUR-ON OPTICAL COMPANY, INC., OF ROCHESTER, NEW YORK, A CORPORATION OF NEW YORK.

OPHTHALMIC MOUNTING.

Application filed May 10, 1922. Serial No. 559,838.

*To all whom it may concern:*

Be it known that I, WILLIAM E. McDONELL, a citizen of the United States, and resident of Rochester, in the county of Monroe and State of New York, have invented certain new and useful Improvements in Ophthalmic Mountings, of which the following is a specification.

The present invention relates to ophthalmic mountings and more particularly to the type in which the frame for supporting the lenses embodies two lens rings preferably continuous, provided with internal lens receiving grooves and connected by a bridging portion, all formed of non-metallic material preferably in one piece, an object of this invention being to provide nose rests for engagement with opposite sides of the nose of a wearer to support the mounting upon the face preferably in connection with temples at the sides of the frame. A further object of the invention is to provide for connecting arms of nose rests to non-metallic ophthalmic frames in such a manner that the arms may be adjusted without placing any undue strain on the means by which the arms are anchored in the non-metallic frame. A still further object of the invention is to provide means for anchoring nose rests in non-metallic ophthalmic frames, such means being held in position between lenses seated in the frame. Still another object of the invention is to provide pockets leading from the lens receiving grooves of a non-metallic frame, such pockets serving to receive anchoring means on arms by which nose rests are supported.

To these and other ends, the invention consists of certain parts and combinations of parts, all of which will be hereinafter described: the novel features being pointed out in the appended claims.

In the drawings:

Fig. 1 is a rear view of an ophthalmic mounting constructed in accordance with this invention;

Fig. 2 is a plan view partially in section of a mounting on an enlarged scale;

Fig. 3 is an enlarged fragmentary view of the mounting showing one of the lenses removed and the adjustable supporting arm for one of the nose rests in section;

Fig. 4 is an enlarged section on the line 4—4, Fig. 3;

Fig. 5 is a section on the line 5—5, Fig. 3; and

Fig. 6 is a perspective view of one of the adjustable supporting arms of the nose rests.

At the present time non-metallic ophthalmic mountings of the type in which the lens rings and bridge are formed in one piece require the carrying by the dealer of a large variety of sizes in order to fit different types of faces. In fact even with a large variety of sizes carried, it is necessary for the dealer, in some instances, to affix an extra piece on the bridge especially for flat noses. According to this invention a non-metallic ophthalmic mounting of the type mentioned is provided with nose rests which have adjustable arms, so connected to the non-metallic frame, that the rests may be adjusted relatively to each other in order to permit any one mounting to be adapted to a number of different types of faces, this connection being such that the adjustment may be secured without the chipping of lenses or the disconnection of the adjustable arms from the mounting.

In the illustrated embodiment of the invention, 1 indicates the lens rings formed of non-metallic material, such as zylonite, and 2 a bridge connecting said lenses and formed of the same material in one piece with the ring. Temples 3 of any suitable construction are pivotally connected at 4 to the outer sides of the lenses to support the mounting on the user. The rings 1 have internal grooves 5 in which the lenses 6 are received, the rings being continuous and unsplit, thus requiring them to be heated in order to expand the same so that the lenses 6 may be fitted or removed.

Associated with the mounting are the nose rests 7 which are adjustably supported on the ophthalmic frame through adjustable arms, each arm, in this instance, having a rearwardly projected portion 8 and a forwardly projecting portion 9 extending from the rear end of the rearwardly projecting portion and having the sleeve 10 of the rest 7 rocking thereon. The adjustable arms 8 and 9 are formed of ductile metal, so that they may be bent in order to secure the proper position of the rest 7 with reference to the nose of the wearer. With the end in view of securing each adjustable arm 8 and 9 to the ophthalmic frame in such a manner that the adjustment of the arm will not destroy the connection with the non-metallic frame, a novel anchoring means is provided. This anchoring means, in this instance, has a portion 11 received within a lens groove adjacent the bridging portion 2 and preferably curved to conform to said lens groove, the inner face of this portion being grooved at 12 so as to receive the bevelled edge of the lenses, while said anchoring portion 11 lies in the lens groove. The rearwardly extending arm portion 8 of the adjustable arm connects with this portion 11 substantially midway between the ends thereof and to this end the rear face of each ring 1 adjacent the bridging portion 2 is provided with a notch 13 intersecting the lens groove of the ring and having the arm 8 extending therethrough to connect with the anchoring portion 11. If this anchoring portion alone were provided, there would be a tendency for the latter, during the adjustment of the pliable or nose rest supporting arm, to break the lens, and, in order to avoid this, an additional anchoring portion 14 is provided preferably in the form of a projection extending from the anchoring portion 11 adjacent the inner end of the ductile or pliable arm and adapted to be anchored in the non-metallic material at one side of the lens groove. In this instance, pockets 15 are provided extending laterally from the lens grooves 5 and preferably into the bridging portion 2. These anchoring projections 14 would be objectionable as the sole means of anchoring the adjustable nose rest supporting arms as the twisting and turning of said supporting arms would tend to disconnect them from the non-metallic material. While it is preferred to use both of the anchoring devices in combination for the reasons set forth above, it is apparent that it is within the scope of the invention to use them separately.

What I claim as my invention and desire to secure by Letters Patent is:

1. In an ophthalmic mounting, the combination with an ophthalmic frame formed of non-metallic material and having two rings with lens receiving grooves and a bridge connecting said rings and provided with pockets communicating with said grooves, of nose rests having supporting arms provided with anchoring portions extending into said pockets.

2. In an ophthalmic mounting, the combination with an ophthalmic frame formed of non-metallic material and embodying two rings with lens receiving grooves and a bridging portion connecting said rings, of nose rests having supporting arms provided with anchoring portions fitting in said grooves and curved to conform to the lenses.

3. In an ophthalmic mounting, the combination with a frame formed of non-metallic material and embodying two rings having lens receiving grooves and a bridge connecting said rings, said frame being provided with pockets communicating with said lens receiving grooves, of nose rests having supporting arms provided with anchoring portions extending into the pockets of the lens receiving grooves.

4. In an ophthalmic mounting, the combination with a frame formed of non-metallic material and embodying two rings formed with lens receiving grooves and a bridge connecting said rings and provided with pockets, said frame having notches opposite the ends of the bridging portion and intersecting said lens receiving grooves, of nose rests having arms extending through said notches and into said pockets to secure the nose rests to the mounting.

5. In an ophthalmic mounting the combination with a frame formed of non-metallic material and embodying lens rings provided with lens receiving grooves, and a bridging portion connecting said lens rings, the frame being provided with pockets leading from said lens receiving grooves into the bridging portion and the frame also having notches opposite the ends of the bridging portion intersecting said lens receiving grooves, of nose rests having arms extending through said notches and into said pockets.

6. In an ophthalmic mounting the combination with a frame formed of non-metallic material and embodying lens rings provided with lens receiving grooves, and a bridging portion connecting said lens rings, the frame being provided with pockets leading from said lens receiving grooves into the bridging portion and the frame also having notches opposite the ends of the bridging portion intersecting said lens receiving grooves, of nose rests having arms extending through said notches and into said pockets, said arms also having portions extending in opposite directions from the notches and lying in the lens receiving grooves.

7. In an ophthalmic mounting the combination with a frame formed of non-metallic material and embodying lens rings with lens receiving grooves and a bridging portion connecting said rings, said frame also having pockets leading from said lens receiving grooves, of nose rests having arms provided with anchoring portions fitting in said pockets and anchoring portions lying in the lens receiving grooves on opposite sides of said pockets.

WILLIAM E. McDONELL.